United States Patent [19]

Beyersbergen van Henegouwen et al.

[11] Patent Number: 4,911,534
[45] Date of Patent: Mar. 27, 1990

[54] OPTICAL UNIT FOR INSCRIBING AND/OR SCANNING AN INFORMATION TRACK WITHOUT MECHANICAL CONTACT, AND APPARATUS PROVIDED WITH THE OPTICAL UNIT

[75] Inventors: Cornelis M. Beyersbergen van Henegouwen; Henricus M. C. van Gestel; Petrus J. Blankers, all of Eindhoven, Netherlands

[73] Assignee: U.S. Philips Corporation, New York, N.Y.

[21] Appl. No.: 235,849

[22] Filed: Aug. 24, 1988

[30] Foreign Application Priority Data

Aug. 31, 1987 [NL] Netherlands ................... 8702034

[51] Int. Cl.⁴ .................... G02B 7/02; G11B 5/09
[52] U.S. Cl. .................... 350/255; 369/45
[58] Field of Search ........... 350/255, 252, 245, 484; 369/44, 45

[56] References Cited

U.S. PATENT DOCUMENTS

| 4,449,213 | 5/1984 | Noborimoto et al. | 350/484 |
| 4,596,444 | 6/1986 | Ushida | 350/255 |
| 4,641,296 | 3/1987 | Mizuhoe et al. | 369/45 |
| 4,653,856 | 3/1987 | Kamiko | 350/255 |
| 4,679,904 | 7/1987 | Kurihara | 350/255 |

FOREIGN PATENT DOCUMENTS

| 0221836 | 12/1984 | Japan | 369/45 |
| 0221837 | 12/1984 | Japan | 369/45 |
| 0209935 | 10/1985 | Japan | 369/45 |
| 0253030 | 12/1985 | Japan . | |

Primary Examiner—Bruce Y. Arnold
Assistant Examiner—Ronald M. Kachmarik

[57] ABSTRACT

The optical unit comprises a frame (1), a subrame (3), and objective holder (5) having an objective (7) for concentrating the radiation beam so as to form a radiation spot. First connecting means (11) movably connect the objective holder to the subrame, which first connecting means allow focussing movements of the objective and counteract other movements. Second connecting means (9) movably connect the subframe to the frame, which second connecting means allow radial tracking movements of the objective and counteract other movements. Electrically controllable first focussing means (19), connected to the frame and electrically controllable second focussing means (21) connected to the objective holder cooperate with each other to produce the focussing movements. Electrically controllable first tracking means (19) connected to the frame and electrically second tracking means (25) connected to the objective holder cooperate with each other to produce the tracking movements, and a reflecting surface (13) provided on the subframe directs the radiation beam towards the objective.

8 Claims, 3 Drawing Sheets

OPTICAL UNIT FOR INSCRIBING AND/OR SCANNING AN INFORMATION TRACK WITHOUT MECHANICAL CONTACT, AND APPARATUS PROVIDED WITH THE OPTICAL UNIT

The invention relates to an optical unit for inscribing and/or scanning without mechanical contact, by means of a radiation beam directed at the unit, an information track in a disc rotating about an axis of rotation. The optical unit includes a frame, a subframe, and an objective holder comprising an objective with an optical axis, which objective is adapted to concentrate the radiation beam so as to form a radiation spot in a focussing plane. First connecting means movably connects the objective holder to the subframe, and allows the objective to perform focussing movements directed parallel to the optical axis and which counteract other movements. Second connecting means movably connect the subframe to the frame, which second connecting means allow the objective to perform tracking movements directed transversely of the optical axis and radially of the axis of rotation of the disc which counteract other movements. Electrically controllable first focussing means connected to the frame and electrically controllable second focussing means connected to the objective holder are adapted to cooperate with one another via an air gap for generating and controlling the focussing movements electrically. Electrically controllable first tracking means connected to the frame and electrically controllable second tracking means are adapted to cooperate with one another via an air gap, for generating and controlling the tracking movements.

Such a unit is disclosed in British Patent Application No. 2,090,038 (U.S. Pat. No. 4,449,213). The known optical unit is intended for use in an opticaldisc player, such as a video-disc player. In such a player an optical system comprising an objective focusses a light beam from a radiation source in the disc player in a focussing plane of an optical disc placed on the turntable of the player, to form a radiation spot for optically reading the information stored in an information track of the disc. Since an optical disc is never perfectly flat the track to be read, as the disc rotates, will not be disposed exactly in one plane situated at a fixed distance from the objective. However, to ensure that the focussed radiation spot is situated at the track, the objective must constantly perform focussing movements along its optical axis during operation.

The information track of the optical disc is a spiral track which extends around the axis of rotation of the disc and which, by convention, is read from the inner towards the outer circumference. For the coarse radial tracking of the rotating disc the known optical unit is arranged on a slide which is movable along a radial path relative to the axis of rotation of the turntable. Since the track on the disc may be slightly off-centered and the turntable of the disc player may also exhibit slight radial deviation, allowance must be made for small radial excursions of the information track as the disc rotates. The deviations which then arise between the position of the scanning spot and the location of the track portion to be scanned are generally reduced by means of a radial tracking system, the objective performing small tracking movements which generally have a high-frequency and which are directed radially relative to the axis of rotation of the rotating optical disc. In the known optical unit said tracking movements of the objective are derived from the movements which can be performed by the movable subframe of the optical unit relative to the frame.

The known optical unit comprises an objective holder which is connected to the subframe by a first pair of parallel leaf springs, the subframe in its turn being connected to the frame by a second pair of parallel leaf springs. The leaf springs are oriented in such a way relative to one another that the subframe is capable of performing lateral movements relative to the frame, which movements are oriented transversely of the optical axis of the objective whilst the objective holder is capable of performing movements which are directed parallel to the optical axis relative to the subframe. In order to realize said movements the known unit is provided with two physically separated linear motors. One of the motors comprises a cylindrical coil which surrounds the objective and which is secured to the objective holder, and an annular magnet which is concentric with said coil and which is secured to a cylindrical portion of the frame. This motor serves for driving the objective holder to obtain the focussing movements of the objective. The other motor comprises a pair of planar permanent magnets arranged on U-shaped portions of the frame and a planar coil secured to the subframe and movable in the gaps defined by the U-shaped portions. This motor serves for driving the subframe to obtain the radial tracking movements of the objective.

The known optical unit has the disadvantage that the objective, as it performs radial tracking movements, is moved transversely of the light beam directed to this objective, so that the position of the light beam relative to the optical axis of the objective changes. Such a shift of the light beam relative to the optical axis of the objective may adversely affect the servo tracking systems with which the optical unit cooperates. In particular in tracking systems based on the radial push-pull method a lateral shift of the radiation beam and the optical axis of the objective relative to each other is impermissible. In the push-pull method, which is described inter alia in the book "Principles of Optical Disc Systems" by G. Bouwhuis et al, published by Adam Hilger Ltd., Bristol and Boston, variations in radiation intensity in a cross-section of the radiation beam reflected from the optical disc are detected in order to derive a radial tracking signal. The radiation flux traversing the pupil of the objective is then split into two portions and applied to a suitable detector. A shift of the beam directed to the objective relative to the optical axis of the objective may be interpreted as a deviation in the position of the track after reflection from the detector, resulting in erroneous tracking-error signals being generated, which may impair a correct tracking.

SUMMARY OF THE INVENTION

At least a part of the electrically controllable second tracking means is connected to the objective holder and a reflection device is arranged on the subframe to direct the radiation beam towards the objective.

An optical unit having these characteristic features has the advantage that during tracking movements of the objective the radiation beam can follow the movements of the objective, so that the radial position of the objective and the radiation beam relative to each other does not change. If the radiation beam is directed towards the optical unit in a direction in which the tracking movements are performed it is favourable to provide the reflection device with a stationary diverting mirror or a stationary prism having a reflection surface which is inclined at an angle of 45° to the optical axis of the objective. Such a reflection device can be mounted simply and easily and is therefore cheap. If for the purpose of radial tracking use is made of the afore-mentioned push-pull method of the reflection device will be adapted to centre a cross-section of the reflected radiation beam traversing the objective relative to the optical axis of the objective. The first focussing and tracking means connected to the frame may include at least one common part which cooperates both with the second focussing means and with the second tracking means. If the first focussing means and the first tracking means comprise at least a permanent magnet, if the second focussing means comprise at least a focussing coil, and if the second tracking means comprise at least a tracking coil, the focussing coil and the tracking coil may be secured to each other so that their coil axes extend transversely of one another. This embodiment has a focussing and tracking drive comprising a limited number of parts, is easy to manufacture, and can have small dimensions.

Where the coil axis of the focussing coil extends parallel to the optical axis of the objective, the outer side of the focussing coil may be secured to a wall portion of the objective holder and the inner side of the focussing coil may bound a free space in which an element of a magnetic circuit connected to the frame engages with clearance. It has been found that this arrangement of the focussing coil in conjunction with the aforementioned features of the optical unit in accordance with the invention may result in a high efficiency of the focussing drive.

Where the first connecting means comprise a first pair of leaf springs having a first end connected to the subframe and a second end to the objective holder, and the second connecting means comprise a second pair of leaf springs having a first end connected to the frame and a second end to the subframe, the first ends of the first and the second pair of leaf springs may be situated in the same are which extends at only one side of the optical axis. This arrangement of the leaf spring makes it possible to obtain a very compact optical unit. Preferably, for a further reduction of the dimensions of the unit, the second ends of the first pair and the second pair of leaf springs are also situated in said area.

It is to be noted that Japanese Patent Application 60-253030 discloses an objective lens drive arrangement comprising two pairs of leaf springs. One of the pairs of leaf springs is secured to a plate-shaped support and is connected to the other pair of leaf springs via a plate-shaped connecting member, which other pair of leaf springs is secured to an objective unit comprising the objective lens. The drive arrangement further comprises actuators for moving the objective unit with the objective lens in two mutually perpendicular directions for the purpose of focussing and tracking. This prior-art drive arrangement has the same drawback as mentioned in the description of the optical unit disclosed in British Patent Application No. 2,090,038.

The invention also relates to a device for translating an objective along a radial path relative to a disc which is rotatable about an axis of rotation, comprising a chassis, a turntable for supporting the disc, a slide which can be translated relative to the chassis along said radial path, and parallel guide means for the slide.

Such an apparatus is known from EP No. 0,176,127 (U.S. Pat. No. 4,798,447, herewith incorporated by reference). An objective holder comprising an objective is connected to the slide by means of a pair of leaf springs, which objective can perform focussing movements oriented perpendicularly to the directions of movement of the slide to maintain a radiation beam constantly focussed at the recording surface of the optical disc to be scanned. In order to enable the information track on the disc to be followed by means of the objective in a radial direction relative to the axis of rotation of the disc, the slide is moved together with the objective holder. This does not present any problems for following the information track with a low frequency, but the objective must also be capable of performing high-frequency small radial movements in order to enable local irregularities in the position of the information track to be followed. In the last-mentioned respect it is to be noted that by means of the known device, owing to the comparatively large mass of the slide together with the objective holder and the rather unfavourable radial transmission of the leaf springs, the attainable servo bandwidth is too small to enable the recording track to be followed with very high accuracy.

Therefore, it is another object of the invention to provide a device for translating an objective along a radial path relative to a disc which is rotatable about an axis of rotation, which device meets very stringent requirements at least with respect to the tracking properties. Surprisingly, it has been found that the above object can be accomplished if such a device is provided with an optical unit in accordance with the invention, in which the frame of the unit is connected to the slide.

In contradistinction to the known device, in which the objective is included in a single or single-stage servo-tracking system for constantly following radiation excursions of the information track which occur every revolution, the objective in the device in accordance with the invention is arranged in a two-stage servo-tracking system, the second stage being constituted by the radial movability of the objective relative to the slide. These radial movements to be performed by the objective relative to the slide need only be small and serve to provide high-frequency tracking of the information track. In the case of an appropriate choice of the tracking means of the optical unit a large servo bandwidth is attainable.

A suitable embodiment of the device in accordance with the invention is characterized in that the slide carries a radiation source for emitting the radiation beam.

Since in the device in accordance with the invention the movements of the objective occur only in the direction of the radiation beam and not or only to a negligible non-disturbing extent in directions perpendicular thereto, undesired displacements of the radiation beam relative to the optical axis of the objective do not occur.

On account of the afore-mentioned characteristic features of the device in accordance with the invention is very suitable for use in the latest types of optical audio and video disc players and data recorders.

DETAILED DESCRIPTION OF THE PREFERRED EMBODIMENT

Figure 1:
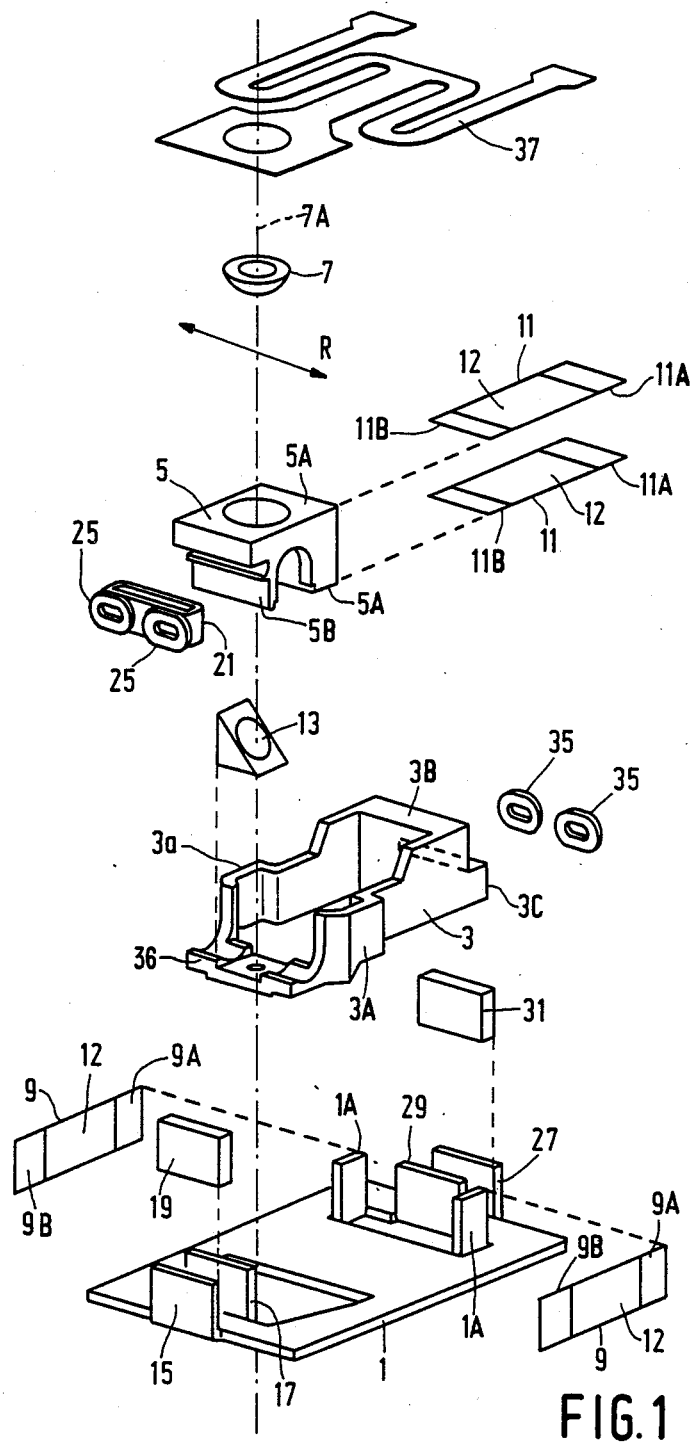
FIG. 1 is an exploded perspective view of the optical unit.

The optical unit in accordance with the invention shown in FIGS. 1 to 4 can be used in a disc player of a type which is intended for inscribing and/or reading optical audio discs, video discs or data discs. The optical unit comprises a frame 1 of a soft-magnetic material, a subframe 3 and an objective holder 5 provided with an objective 7 having an aperture and an optical axis 7A. The objective 7, which in the present example comprises only one lens, serves to focus a radiation beam 6 emitted by a radiation source, for example a semiconductor laser, and to maintain said beam focussed at the recording surface of a rotating optical disc 8 under operating conditions. For this reason it is required that the objective 7 can perform limited movements along its optical axis 7A, hereinafter referred to as focussing movements. In the optical unit in accordance with the invention focussing is effected by moving the holder 5 together with the objective 7 parallel to the optical axis 7A.

Figure 5:
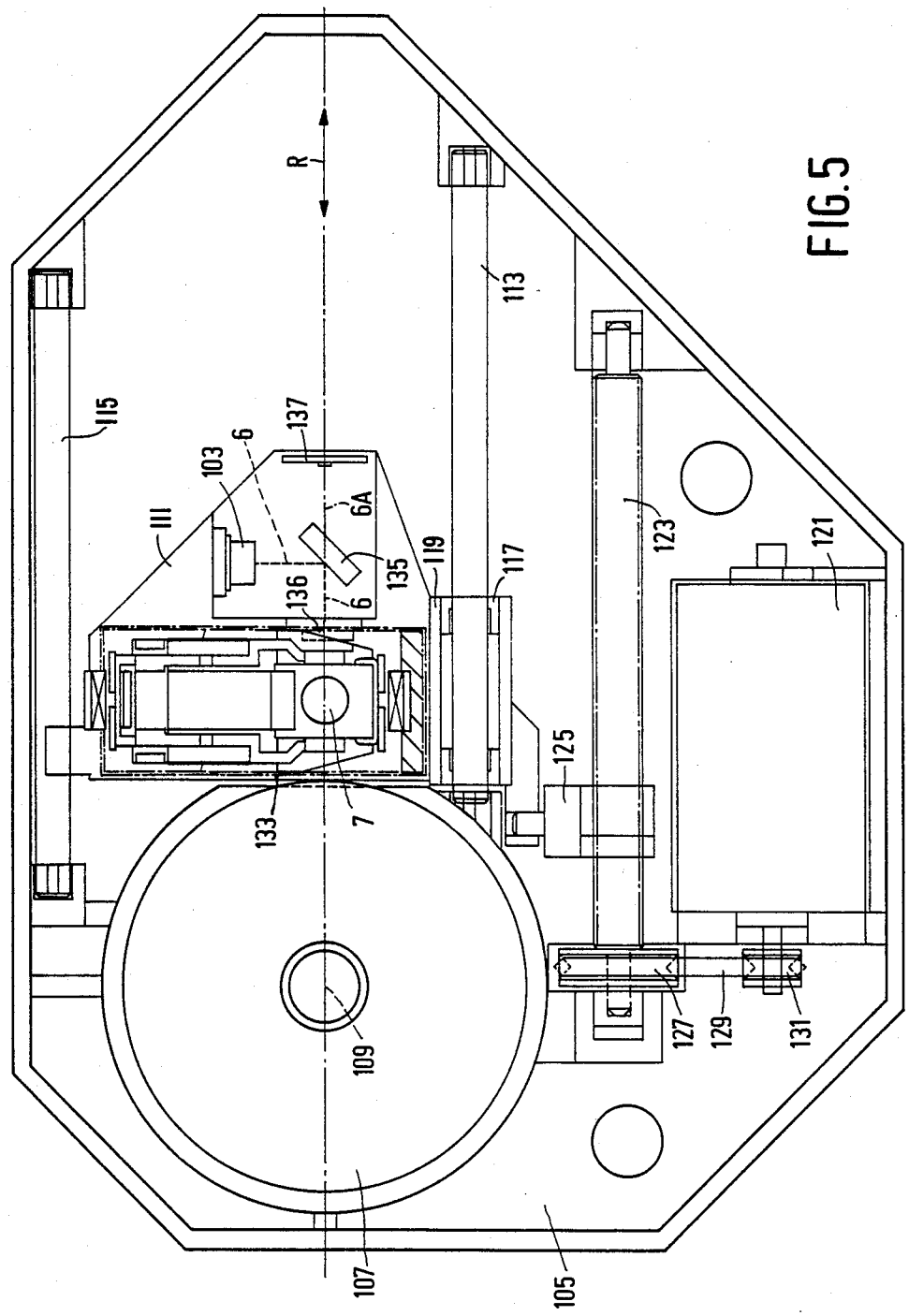
FIG. 5 is a diagrammatic plan view of the relevant parts of an embodiment of the invention.

In addition to focussing movements the objective 7 must also be capable of performing movements to bring and maintain the radiation spot 10 formed by focussing in the desired positions relative to the recording surface of the rotating optical disc. Since the information is stored in or is to be recorded in a spiral track in the recording surface, the last-mentioned movements are also referred to as radial and tangential tracking movements. For the purpose of radial tracking the optical unit may be arranged on a slide, for example as shown in FIG. 5, the slide being capable of performing a rectilinear movement radially of the axis of rotation 109 of the optical disc. On account of the comparatively large mass of the slide carrying the optical unit the objective is only capable of roughly following the track in a radial direction by moving the slide. However, accurate tracking in a radial direction can be achieved by means of the optical unit itself, namely by moving the holder 5 together with the objective 7 relative to the frame 1 over a limited distance in a radial direction, indicated by the double arrow R in FIG. 1. For the purpose of tangential tracking, in order to correct for timing errors, use can be made of electronic delay means.

In order to move the holder 5 with the objective 7, the optical unit is provided with two pairs of leaf springs 9, 11. The two parallel leaf springs 9, which are provided with a strip 12 of a damping material, support the subframe 3 on the frame 1 and allow movements of the subframe 3 relative to the frame 1 in directions indicated by the arrow R. The leaf springs 9 each have a first end surface 9A secured, for example, by gluing, to an upright wall portion constituted, for example, by a bent lug 1A of the frame 1 and they have a second end surface 9B secured to a lateral surface 3A of the subframe 3. The two parallel leaf springs 11 connect the holder 5 to the subframe 3 and allow movements parallel to the optical axis 7A of the holder 5 relative to the subframe 3, and they each have a first end surface 11A secured to a wall portion 3B of the subframe 3 and a second end surface 11B to an upper and lower surface 5A if the holder 5. The above construction counteracts any movements other than the afore-mentioned ones. This means that the objective 7 can perform well-defined focussing movements and radial tracking movements relative to the frame 1.

A surface 3C of the subframe 3 carries a reflection block having a reflection surface 13 for reflecting the radiation beam 6, which is directed to the optical unit parallel to the direction indicated by the arrow R, towards the objective 7. The reflection surface 13 is disposed on a prism and is intersected by the optical axis 7A, an angle of 45 being formed between the optical axis 7A and the reflection surface 13.

For the actuation of the objective holder 5 to perform said movements the optical unit is provided with electromagnetic actuator means comprises electrically controllable focussing means and electrically controllable tracking means. The focussing means comprise first means connected to the frame 1 and constituted by two ferromagnetic plates 15 and 17 of the frame 1 and a permanent magnet 19 secured to the plate 15 and having a magnetic axis which extends parallel to said leaf springs, and a second means connected to the objective holder 5 and constituted by a substantially rectangular focussing coil 21 which is secured to a wall portion 5B of the holder 5 and which surrounds the plate 17 with clearance, which coil cooperates with the magnet 19 via an air gap 23. The tracking means comprise first means connected to the frame and constituted by the said parts 15, 17 and 19 and second means comprising two annular tracking coils 25 which are secured to the focussing coil 21 and which cooperate with the magnet 19 via the air gap 23.

Figure 2:
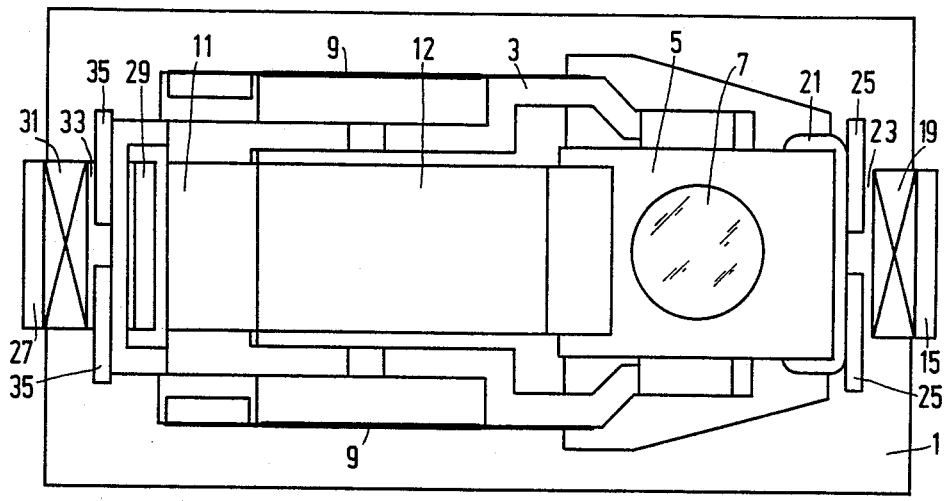
FIG. 2 is a plan view of the optical unit shown in FIG. 1.
Figure 3:
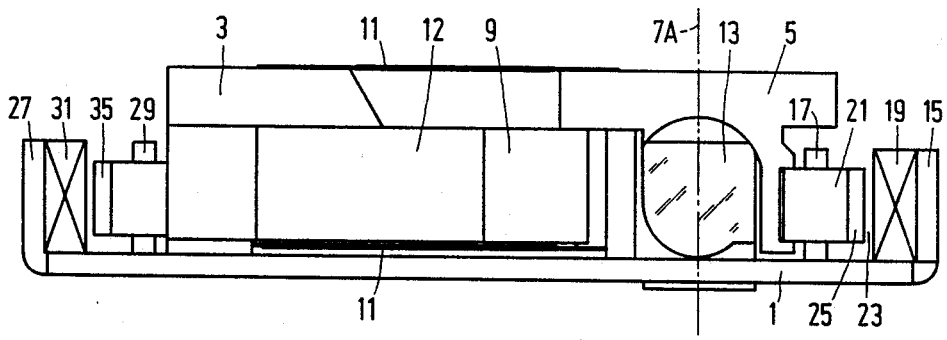
FIG. 3 is a side view of the optical unit shown in FIG. 1.
Figure 4:
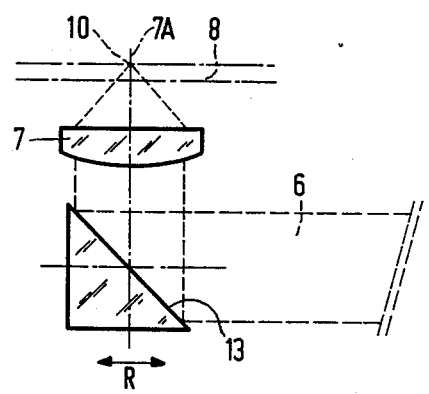
FIG. 4 shows diagrammatically a part of the optical unit shown in FIG. 1.

In order to support the tracking means and to minimize the load on the leaf springs and hence the risk of resonances, additional tracking means may be provided, as is shown in FIGS. 1, 2 and 3. These additional tracking means may comprise, for example, two ferromagnetic plates 27 and 29 of the chassis 1, a permanent magnet 31 secured to the plate 27 and having a magnetic axis which coincides with the magnetic axis of the magnet 19, and two tracking coils 35 which are secured to an end surface 3C of the subframe and which cooperate with the magnet 31 via an air gap 33.

Leads, not shown, of said coils 21, 25 and 35 are secured to a foil 37 and are electrically connected to electrical conductors arranged on this foil. The foil 37 is secured to the upper surface of the holder 5.

The device in accordance with the invention shown in FIG. 5 is intended for inscribing and/or reading information tracks in a reflecting recording surface of an optical disc by means of the radiation beam 6 emitted by a laser 103, for example a semiconductor laser. The device comprises a chassis 105, which supports an electrically drivable turntable 107 for the optical disc for rotation about the axis of rotation 109. The device further comprises mechanical guide means for radially translating a slide 111 relative to the turntable 107 (as indicated by the arrow R). The guide means comprise two guide rods 113 and 115 secured to the chassis 105 to cooperate with a sleeve 117 and a sliding element 119 of the slide 111. The device further comprises an electric motor 121 which is supported in the chassis 105, for driving the slide 111 via a transmission device. The transmission device may comprise a lead screw 123 which is supported in the chassis and a threaded bush 125 which cooperates with said lead screw and which is mechanically connected to the slide 111, as well as a pulley 127 secured to the lead screw 123 and a belt 129 which forms the connection between the pulley 127 and a pulley 131 of the motor 121.

The slide 111 carries an optical unit 133 in accordance with the invention, which is consequently of the type as shown in the preceding Figures. For a description of the optical unit 133 reference is made to the parts specifically relating to the optical unit in accordance with the invention. The radiation beam 6 emitted by the laser 103 on the slide 111 is reflected in a radial direction by a semitransparent mirror 135 arranged on the slide 111, after which the radially directed radiation beam 6 is incident on the reflecting surface 13 of the optical unit 133 via a collimator lens 136 and is subsequently focussed by the objective 7 to form a radiation spot 10 in the recording plane of an optical disc 8 (see also FIG. 4).

The radiation beam, which is modulated by the information and which is reflected by the optical disc as it is scanned, is transmitted by the semi-transparent mirror 135 as a beam 6A. Subsequently, the beam 6A is incident on a semiconductor-diode system 137. Since the construction and the operation of the system 137 are irrelevant to the present invention, this system will not be described in further detail. It is to be noted that the device in accordance with the invention is very suitable for use in a tracking system based on the push-pull method, but this is not to the exclusion of other tracking systems, for example those based on the radial-wobble method or the three-spot tracking method.

Obviously, the invention is not limited to the embodiments shown herein. For example, in some cases the additional tracking means as shown in FIGS. 1, 2 and 3 may be dispensed with. Alternatively, the radiation source may be arranged on the chassis of the device.

What is claimed is:

1. An optical unit for inscribing and/or scanning without mechanical contact, by means of a radiation beam directed at the unit an information track in a disc rotating about an axis of rotation, which unit comprises:
    a frame;
    a subframe;
    an objective holder comprising an objective with an optical axis, which objective is adapted to concentrate the radiation beam so as to form a radiation spot in a focussing plane;
    first connecting means for movably connecting the objective holder to the subframe, which first connecting means allow the objective to perform focussing movements directed parallel to the optical axis and which counteract other movements;
    second connecting means for movably connecting the subframe to the frame, which second connecting means allow the objective to perform tracking movements directed transversely to the optical axis and radially of the axis of rotation of the disc and which counteract other movements;
    electrically controllable focussing means connected to the frame and the objective holder, via an air gap, for generating and controlling said focussing movements electrically;
    electrically controllable tracking means connected to the frame and the objective holder through an air gap for generating and controlling said tracking movements; and
    a reflection device arranged on the subframe to direction the radiation beam towards the objective.

2. An optical unit as claimed in claim 1, in which the focussing and tracking means connected to the frame comprise at least one common part.

3. An optical unit as claim in claim 1, in which the focussing means and the tracking means comprise at least a permanent magnet connected to the frame, in which the focussing means comprises at least a focussing coil, and the tracking means comprises at least a tracking coil, and the focussing coil and the tracking coil are secured to each other and their coil axes extend transversely of one another.

4. An optical unit as claimed in claim 3, in which the coil axis of the focussing coil extends parallel to the optical axis of the objective and the outer side of the focussing coil is secured to a wall portion of the objective holder and the inner side of the focussing coil bounds a free space in which an element of a magnetic circuit connected to the frame engages with clearance.

5. An optical unit as claimed in claim 3, characterized in that adjacent said tracking coil a similar tracking coil is arranged.

6. An optical unit as claimed in claim 1, in which the reflection device comprises a reflecting surface which is disposed at an angle of 45° to the optical axis of the objective.

7. An optical unit as claimed in claim 1, in which the first connecting means comprise a first pair of leaf springs having a first end connected to the subframe and a second end connected to the objective holder, and in which the second connecting means comprise a second pair of leaf springs having a first end connected to the frame and a second end connected to the subframe, and the first ends of the first and the second pair of leaf springs respectively are situated in the same area which extends at only one side of the optical axis.

8. An optical unit as claimed in claim 7, characterized in that the second ends of the first pair and the second pair of leaf springs respectfully are situated in said area.

* * * * *